April 14, 1936.    W. W. COWGILL    2,037,009
PROCESS OF TREATING FOOD MATERIALS
Filed March 31, 1933
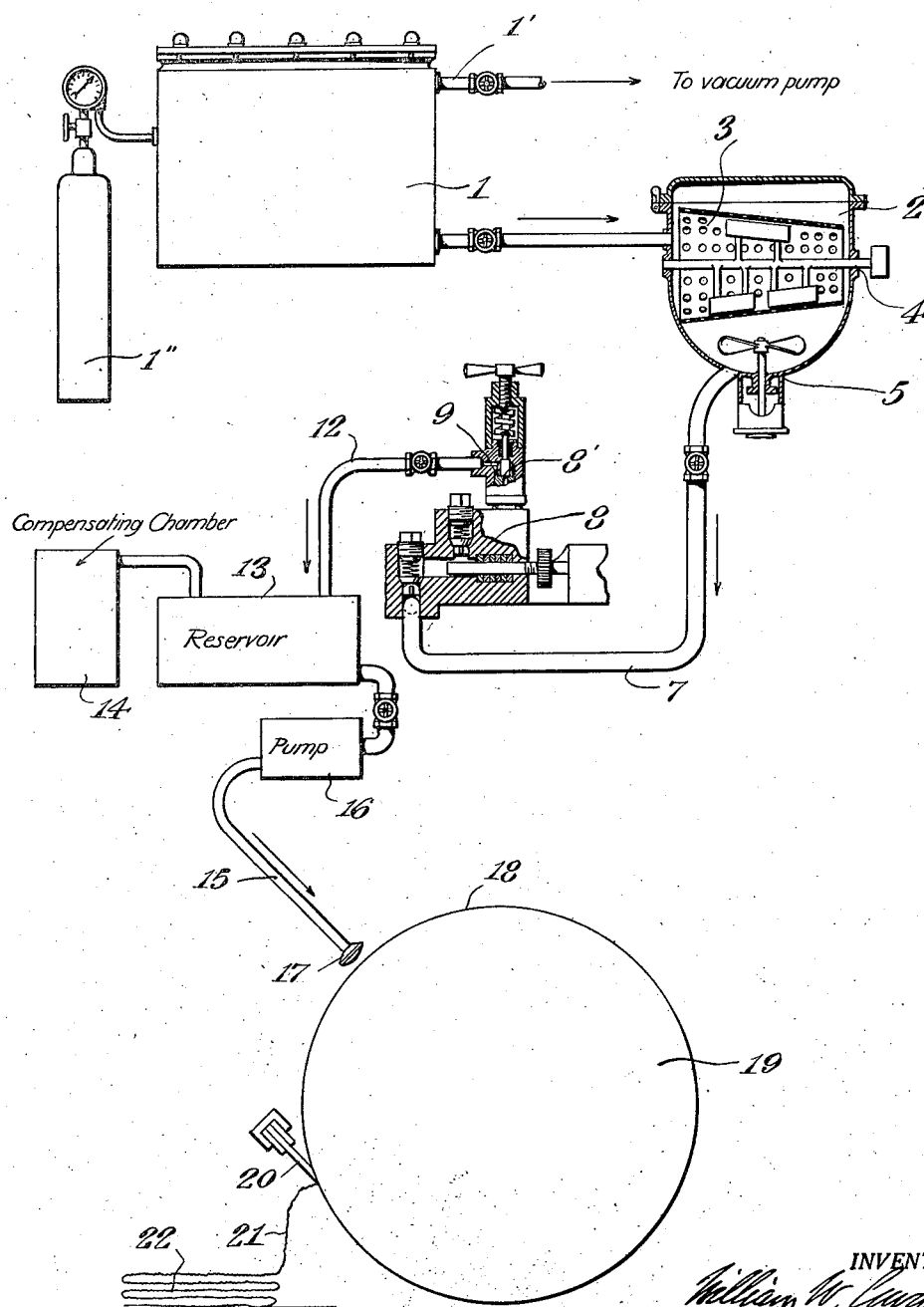

Patented Apr. 14, 1936

2,037,009

UNITED STATES PATENT OFFICE 2,037,009

PROCESS OF TREATING FOOD MATERIALS

William W. Cowgill, Fairfield, Conn., assignor to Sardik Incorporated, Jersey City, N. J., a corporation of Delaware Application March 31, 1933, Serial No. 663,690

2 Claims. (Cl. 99—199)

This invention relates to food products and more particularly to the treatment of food materials to render them resistant to ordinary deteriorating influences.

The previously filed application of Jack D. Sartakoff, Serial Number 582,815, filed December 23, 1931 sets forth a treatment of certain food materials to form a deterioration-resistant product of low moisture content by a drying operation.

However, I have noticed that when certain materials are subjected to such a process as is described in the above application and are subsequently prepared for use, by incorporating them with a suitable liquid in the case of the dried material, the solid content of the product comprising substantially whole cells or groups of cells tends to separate from the liquid component when left standing for any appreciable time. The solids settle to the bottom of the container and leave a substantially clear liquid at the top. This produces an unsatisfactory condition which is especially pronounced when a large proportion of liquid is employed. While it is possible to overcome this characteristic by suitable treatment of the liquid this involves the handling of bulky material in large quantities with attendant expense and difficulty.

An object of this invention is to provide an improved process of treating food materials to render them resistant to deterioration and to form a material suitable for use in providing a liquid or semi-liquid product in which substantially no separation of the solid and liquid components will occur.

This and other objects are accomplished by the present invention which can be carried out with any suitable apparatus such, for example, as that diagrammatically illustrated in the attached drawing.

The present invention is adapted to the treatment of material for numerous mixtures, beverages, fruit drinks and the like, and fruits and vegetables of the type referred to in the said Sartakoff application can also be successfully treated in acordance with the present invention.

The fruit or vegetable, which may be either raw or cooked as desired, is first formed into a pulp. Preferably, the material is prepared for pulping or held in readiness therefor in an inert atmosphere. Prior to the pulping step the material is subjected to a vacuum for the purpose of extracting any air or oxygen therefrom after which the vacuum is released and an inert atmosphere, such as nitrogen or the like, is substituted. In this way not only is the material protected against direct oxidation during treatment, but material collecting in the pulper or other apparatus is also protected against oxidation and contamination of fresh material passing through the apparatus is prevented because no accumulation of oxidized material in the apparatus can occur. In the pulping operation such extraneous materials as seeds, cores, skins and the like can be removed and after the pulping operation the material is agitated or stirred in order to thoroughly mix the ingredients, especially where a plurality of fruits or vegetables are being combined.

Such a pulp contains a large proportion of particles made up of whole cell bodies or similar portions of the solid component of the material. While most materials in this condition are admirably adapted for treatment by the Sartakoff process above referred to, the difficulty arises when materials are subsequently made into the final product for consumption. I have discovered that this difficulty in the final product may be overcome by subjecting the material to treatment when in pulp form and prior to drying to reduce the size of the particles by breaking up the cell bodies or other solid component and reduce the size thereof to very fine particles. This can be done in any desired way. One practical means of accomplishing this result is by forcing the material at high pressure through a small orifice and against an impact surface thereby breaking up the cells and solids into such relatively fine particles as will be capable of suspension in the final product for indefinite periods without substantial separation or settling. Such an operation also distributes the particles evenly throughout the liquid component of the material so as to form a substantially homogeneous pulp.

In subjecting a pulp to such an operation as above described, the individual cells break up and the cell contents which are normally protected within the cell wall are exposed so that the sugars, acids and other contents of the original cell bodies are grouped about the fragments of the cell walls. As a result of the extremely small size of the cell particles and the fact that the cell contents are directly exposed, it is possible to accompish the drying of the material with extreme rapidity. For example, such material can be dried more rapidly and at a lower temperature than is possible with the original material in which the cell bodies are substantially intact. In the present process after breaking up the solid component the material is immediately subjected to further treatment to render it deterioration-resistant.

The material is preferably distributed over a treating surface in such a manner as to disperse the finely divided particles thereon so that all particles will be subjected substantially directly to the drying temperature and no particle will be insulated therefrom by any accumulation of other particles. In drying, the process described in the above mentioned Sartakoff application may be used to advantage. The distribution of the material over the treating surface in the manner described permits the drying operation to be accomplished almost instantaneously and the material to be removed from the surface before any damage, such as oxidation, injury to the vitamins or the like, can occur.

Any suitable apparatus can be employed such, for example, as the mechanism diagrammatically illustrated in the accompanying drawing. The material is first located in the hopper 1 adapted to be connected by a line 1' to a vacuum pump or the like and also connected through a valve with a nitrogen tank 1" or other source of inert gas. When the material is first placed in the hopper and the hopper suitably sealed, it is subjected to a vacuum for the purpose of extracting any air or oxygen from the material. The hopper and rest of the apparatus is then filled with an inert gas such as nitrogen and the material is fed from the hopper to a pulper 2 in which it is subjected to the operation of a pulping mechanism 3 driven by a shaft 4 operated from any desired source. During the pulping operation the material is also thoroughly mixed and stirred by an agitator 5. The pulp is next transferred from the pulper through a line 7 to a mechanism 8 in which the material is forced through a small orifice 8' under high pressure and against an impact surface 9 to break up the solids and cell bodies into small particles on and about which the original contents of the cells are grouped, and which are distributed substantially evenly throughout the material. In this form the material is capable of being dried, with extreme rapidity. Though the device indicated generally by the numeral 8 consisting of a pump or pumps adapted to take the material from the pulper and force it through an orifice or orifices to produce the disrupting and fragmentation of the particles as described is a very satisfactory means for accomplishing this result, other devices can, of course be employed. After the particles are broken up the material is delivered through a suitable line 12 to a sealed reservoir 13 connected to a compensating chamber 14 for maintaining a substantially constant pressure in the reservoir despite variations in volume of material therein. From the reservoir the material is forced through a line 15 by a pump 16 or the like to a distributing device such as a spray head 17 or the like which disperses the material over the drying surface in such a manner as to substantially separate the particles thereon. The drying surface may be the outer face 18 of an interiorly heated, rotating drum 19 on which the material is dried, preferably by the process described in the above mentioned Sartakoff application and from which the dried material is removed by a suitable scraper 20. In the case of the Sartakoff process, the scraper 20 consolidates the partially dried, dispersed particles simultaneously with the removal thereof from the drying surface and forms a continuous film 21 which may be folded to provide a laminated mass 22 of dry, deterioration-resistant food material which can be employed to readily reproduce the original material by the addition of water thereto. I have dried tomato pulp treated in the manner described by subjecting the same on a drum to a temperature of not more than 192° Fahrenheit for a period of not more than 5 seconds. I have also dried strawberries treated in the manner set forth by subjecting the pulp to a temperature of 188° Fahrenheit for a period of not more than 5 seconds.

It will be found that dried material prepared in the above manner when mixed with liquid will form a mass in which the solid particles are evenly suspended throughout the liquid and will remain in that condition indefinitely or for a substantial length of time.

I claim:

1. The process of preparing a food product of reduced moisture content from a food material comprising cellular particles which consists in subdividing the solid component of the cellular particles to form structurally individual particles of less than normal cell size having the contents of the original cells exposed on the surfaces of the particles, dispersing said particles substantially evenly throughout the liquid component of the material to provide a uniform suspension of said particles in said liquid, then distributing the material over a heated drying surface so as to substantially separate said particles thereon so that each particle will be subjected to a substantially equal amount of heat, subjecting the particles in dispersed condition to heat sufficient to reduce the moisture content to a predetermined point, and removing the material from said surface.

2. The process of preparing a food product of reduced moisture content from a food material comprising cellular particles which consists in subdividing the solid component of the cellular particles to form structurally individual particles of less than normal cell size having the contents of the original cells exposed on the surfaces of the particles, dispersing said particles substantially evenly throughout the liquid component of the material to provide a uniform suspension of said particles in said liquid, then distributing the material over a heated drying surface so as to substantially separate said particles thereon so that each particle will be subjected to a substantially equal amount of heat, subjecting the particles in dispersed condition to a drying temperature below the boiling point of water, and removing the material from said surface.

WILLIAM W. COWGILL.